(12) United States Patent
Uhl

(10) Patent No.: US 12,013,522 B2
(45) Date of Patent: Jun. 18, 2024

(54) MICROSCOPE DEVICE

(71) Applicant: Miltenyi Biotec B.V. & CO. KG, Bergisch Gladbach (DE)

(72) Inventor: Rainer Uhl, Munich (DE)

(73) Assignee: Miltenyi Biotec B.V. & CO. KG, Bergisch Gladbach (DE)

(*) Notice: Subject to any disclaimer, the term of this patent is extended or adjusted under 35 U.S.C. 154(b) by 390 days.

(21) Appl. No.: 17/267,879

(22) PCT Filed: Aug. 12, 2019

(86) PCT No.: PCT/EP2019/071582
§ 371 (c)(1),
(2) Date: Feb. 11, 2021

(87) PCT Pub. No.: WO2020/038753
PCT Pub. Date: Feb. 27, 2020

(65) Prior Publication Data
US 2021/0173192 A1    Jun. 10, 2021

(30) Foreign Application Priority Data
Aug. 20, 2018  (EP) ..................................... 18189767

(51) Int. Cl.
*G02B 21/00* (2006.01)
*G02B 21/02* (2006.01)
(Continued)

(52) U.S. Cl.
CPC ........... *G02B 21/241* (2013.01); *G02B 21/02* (2013.01); *G02B 21/08* (2013.01); *G02B 21/26* (2013.01); *G02B 27/141* (2013.01)

(58) Field of Classification Search
CPC ............... G02B 21/00; G02B 21/0004; G02B 21/0012; G02B 21/0032; G02B 21/0052; G02B 21/006; G02B 21/008; G02B 21/02; G02B 21/025; G02B 21/06; G02B 21/08; G02B 21/082; G02B 21/084; G02B 21/086; G02B 21/10; G02B 21/24; G02B 21/241; G02B 21/242; G02B 21/244; G02B 21/245; G02B 21/26; G02B 21/361; G02B 21/365
(Continued)

(56) References Cited

U.S. PATENT DOCUMENTS

| | | | | |
|---|---|---|---|---|
| 5,604,344 A * | 2/1997 | Finarov | ................ | G02B 21/245 250/201.3 |
| 7,205,518 B2 * | 4/2007 | Neuvonen | ............ | G02B 21/241 250/201.2 |

* cited by examiner

Primary Examiner — Thong Q Nguyen
(74) Attorney, Agent, or Firm — Jaquelin K. Spong

(57) ABSTRACT

A microscope device includes an objective (1); an actuator (6) for adjustment of a distance in a focusing direction z, an absolute z-position detector (7) for measuring a z-position. The device further includes an autofocus light source (11); a first optical arrangement (12, 13) for generating a focused spot (31) of autofocus light from the light source in the backfocal plane (14) of the objective (1) at a position offset from the optical axis of the objective by a lateral offset distance (d) The objective generates a collimated incoming beam (22) of autofocus light, which is directed at an oblique angle (β) relative to the optical axis (15) of the objective onto the substrate. The microscope may further include a second optical arrangement (13, 16) for generating collimated outgoing beams (34, 35) of autofocus light and directing the collimated outgoing beam onto a detector-array (17).

14 Claims, 5 Drawing Sheets

(51) Int. Cl.
    *G02B 21/08*          (2006.01)
    *G02B 21/24*          (2006.01)
    *G02B 21/26*          (2006.01)
    *G02B 27/14*          (2006.01)

(58) Field of Classification Search
    USPC .................................................. 359/368–398
    See application file for complete search history.

MICROSCOPE DEVICE

CROSS REFERENCE TO RELATED APPLICATIONS

Not applicable.

STATEMENT REGARDING FEDERALLY SPONSORED RESEARCH

Not applicable.

STATEMENT REGARDING MICROFICHE APPENDIX

Not applicable.

BACKGROUND

The invention relates to a microscope device including an autofocus functionality.

Examples of microscope devices with autofocus functionality are described in US 2015/0309297 A1, US 20130100272 A1 and U.S. Pat. No. 9,772,549 B2. Another example is a microscope device available from Nikon Corporation, Minato, Japan, under the product designation "Perfect Focus System". In all of these known devices the autofocus light is focused onto the substrate by the microscope objective.

It is an object of the invention to provide for a microscope device having a relatively fast and accurate autofocus functionality.

SUMMARY

This object is achieved by a microscope device.

Preferably, the absolute distance measuring unit of the z-position actuator and the actuator itself form part of a drive feedback control loop, which includes a drive controller that can be programmed to direct the actuator to move a given distance from a z-position setpoint, and wherein the central control unit is configured to determine the absolute distance to the target z-position from this setpoint, which is established on the basis of information obtained from the relative z-position detector. The central control unit preferably is configured to detect a point in time when—in the course of a focusing action—the collimated outgoing autofocus light beam reaches a predetermined threshold position on the relative position detector and thus can determine the absolute z-position distance the actuator needs to move from there in order to reach its target z-position.

Typically, the sample-adjacent substrate is transparent and comprises a front surface facing the objective and a back surface parallel to the front surface spaced apart by the thickness of the substrate, wherein the threshold z-position corresponds to the z-position of the actuator in which the objective focal plane coincides with the front surface of the substrate, and wherein the target distance corresponds to the targeted depth within the sample plus the thickness of the substrate.

In case the thickness x of the substrate is known with sufficient accuracy, the value x may be added as a preset value by the central control unit to the distance y the targeted focal plane lies within the sample, thus the actuator has to move the distance x+y upon passing the threshold-surface. Otherwise, the central control unit may be configured to determine the thickness of the substrate as the difference between the threshold z-position and a second z-position provided by the absolute z-position detector at the point in time when the position of the outgoing collimated beam reaches a predetermined second position on the detector and wherein the second z-position corresponds to the z-position of the actuator in which the objective focal plane coincides with the back surface of the substrate.

Preferably, the central control unit is configured to determine the threshold z-position from the position reported by the z-position detector of the focus drive at the time the centroid of intensity values from at least three sensor elements of a relative position detector assumes a predetermined value The proposed microscope device may be able to find a given focus position within a few hundred milliseconds ("focus-find" mode) and to maintain it with nanometer-precision under varying thermal conditions ("focus-hold" mode). Readjustments in the course of a focus-hold may be so fast as to hold the position with high precision even when the sample is rapidly (for example at 10 mm/s) moved relatively to the objective. A central intelligence controls the focus drive actuator by combining the information from two different sensors in real-time, A first actuator-associated detector (acting as an "absolute z-position detector") with a response time in the low microsecond time-domain measures the actuator position in coordinates of the microscope hardware. It is part of a fast feedback loop with the actuator of the focus-drive. The second detector (acting as a "relative z-position detector") is geared to sample-related reflexes of an "autofocus light beam", which is collimated by the objective and reflected by one or two sample-related interfaces. It may act as a fast reacting (100 µs response-time) adaptive "light barrier" which enables an "on the fly" recalibration of the first sensor in the course of the focusing process.

For example, as the actuator approaches a putative target z-position at maximal speed, it passes the light barrier provided by the second (relative) position detector, issues a corresponding command to the central intelligence, which, in turn, combines this sample-related information with the absolute position information of the first detector, the z-position of the actuator at that time, into an absolute target z-position in actuator coordinates. This "on the fly" calibration of the first (absolute) detector system with the coordinates of the second, relative detector system provides the basis for the control-commands the central intelligence issues to the feed-back loop controlled focus drive in the course of a focus-find operation. A focus-hold operation, on the other hand, consists of repetitive recalibration actions of the same kind, whereby their frequency can be adjusted to reflect the anticipated need. If thermal drift is to be compensated, 1 Hz or less may suffice, if a rapidly moving sample is to stay in focus, a recalibration every 5 ms may be necessary. Recalibration means for the central intelligence to translate a shift of the intensity centroid reported by the relative position detector into appropriate move commands for the focus-drive actuator.

Preferred embodiments of the invention are defined in the dependent claims.

BRIEF DESCRIPTION OF THE DRAWINGS

Hereinafter, examples of the invention will be illustrated by reference to the attached drawings, wherein.

DETAILED DESCRIPTION

Figure 1A:
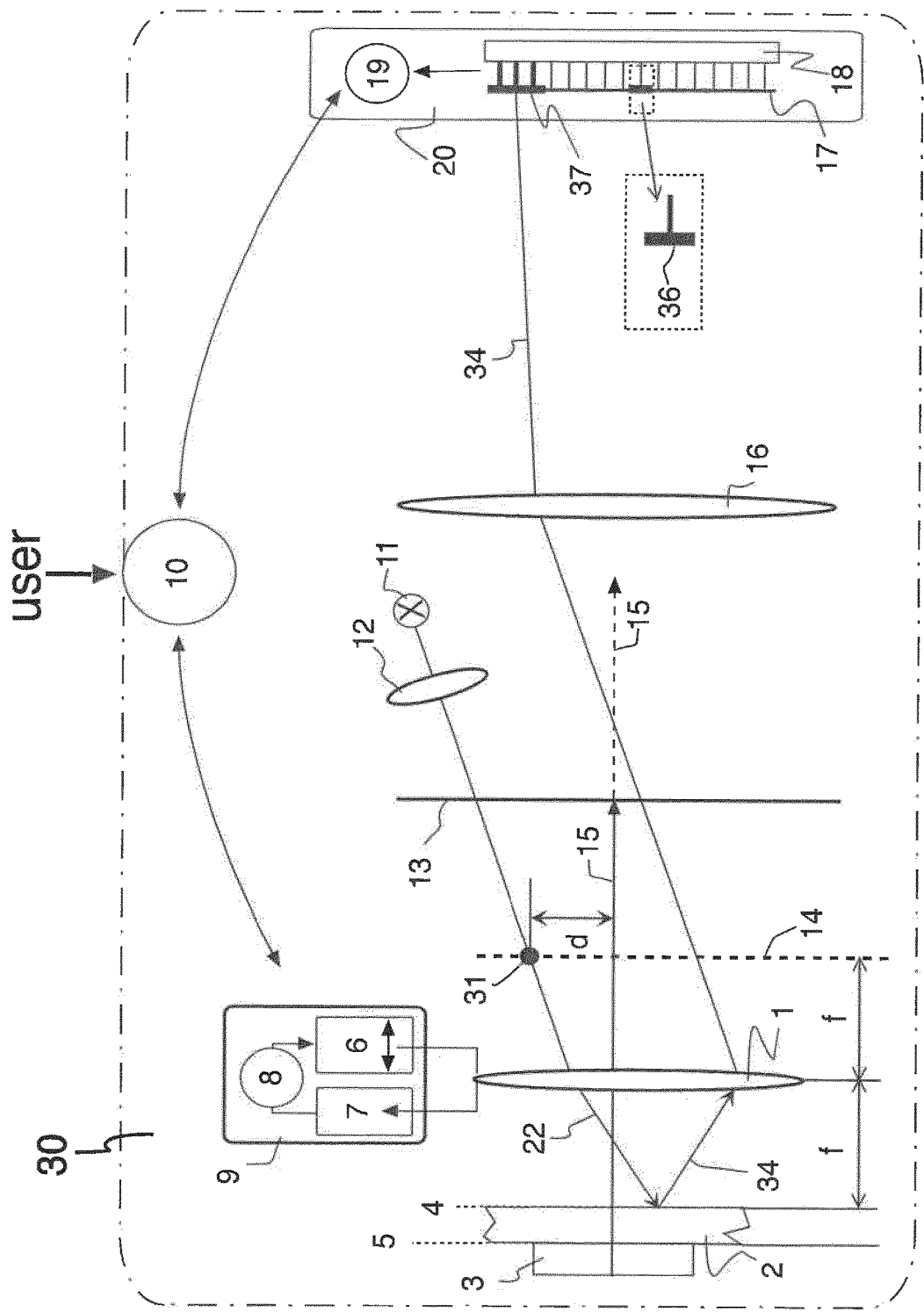
FIG. 1A is a schematic view of an example of a system including a microscope device with an autofocus functionality according to the invention, wherein the focal plane of the objective coincides with a substrate surface facing the objective.

In FIG. 1 an example of a microscope device 30 with autofocus functionality is illustrated, comprising an objective 1 for imaging an object 3 mounted onto (in case of an inverted microscope) or under (in case of an upright microscope) a sample substrate 2, usually a coverslip with a first optical interface 4 and a second optical interface 5, and a focus drive 9. The focus drive 9 comprises an actuator 6 to change the distance between the objective 1 and sample 3 on its mounting substrate 2, an absolute z-position detector 7 measuring the z-position of the objective 1 in actuator-coordinates, and a real-time drive controller 8, which controls the speed of the actuator 6 as it approaches the z-position given by a real-time system controller 10 acting as a central control unit. It is to be understood that, whenever in the following the objective is moved relative to the sample in order to change the focus position, one could—to the same effect—also move the sample relative to a fixed objective-position.

The real-time system controller 10 can relay instructions obtained from a user directly to the controller 8 of the actuator 6. An autofocus functionality can be established by balancing information from the absolute position detector 7 of the focus drive 9 with information from a relative position detector 20, so as to translate a user request—a position relative to the sample and its supporting substrate—into a request the focus drive 9 can interpret, namely a command in terms of its absolute position. This matching of information from the absolute and the relative position detector may occur at kHz rate and leads to commands for the absolute position focus drive 9, which are updated at an equal rate, so as to align the two detector-systems in real time. Keeping the relative position detector 20 out of the immediate feedback-loop of the focus drive 9, but instead inserting an intelligent real-time filter (realized by controller 10), allows for a plausibility test that can prevent potentially hazardous moves of the focus drive 9. The focus drive 9 can exhibit accelerations well over 1G (G=9.8 m/sec^2) and possesses a highly robust (absolute) position sensor 7, which may be read out, for example, every 10 μs and works over an extended travel range of several millimeters, whereas the relative position detector 20, comprising a sensor-array 17, sensor electronics 18 and a real-time controller 19, exhibits a limited working range only, is read out, for example, at a 10× slower rate and may be perturbed by irregularities on the reflecting surfaces 4 and 5, respectively.

The relative z-position information can be obtained by focusing light from an IR (infrared) laser 11 (hereinafter also referred to as "autofocus light") by using a focusing element 12 and combining it, with the help of a suitable dichroic beamsplitter 13, with the imaging-light beam 15 of the microscope in such a manner that the focal point (illustrated as spot 31) of the IR-laser beam falls onto the backfocal-plane 14 of the objective 1 (e.g., within ±10% of the focal length t), thus creating a collimated beam 22 on the side of the objective 1 facing the sample substrate 2 (it is to be noted that the beamsplitter 13 combines respectively separates the autofocus-light beams (22, 34, 35) from the imaging-light beam 15 by reflection out of the paper-plane in FIGS. 1A and 1B. For the sake of simplicity, however, beams are shown to remain in the same plane). The numerical aperture (NA) of the focused cone 33 of autofocus light is adjusted in such a way that the collimated laser beam, passing the objective 1, exhibits a diameter of at least 6%, for example, 10-12%, of the objective's usable field of view (as used hereinafter, a spot/beam "diameter" is the distance between points where the intensity has dropped to $1/e^2$). Reflected light from the two substrate interfaces 4 and 5 (denoted as beams 34 and 35, respectively) is collected by the objective 1 and is separated from the microscope imaging beam path 15 by the dichroic beamsplitter 13. A tube lens 16 forms an image of the reflected beams 34 and 35 (provided there are reflecting surfaces 4 and 5) on the sensor-array 17 of the relative z-position sensor 20, comprising multiple detector elements 36, each forming a separate channel. Each sensor channel preferably is able to record and digitize intensity values at a rate of better than 1 kHz, and to resolve intensity changes below a $\partial I/I = 5 \times 10^{-5}$. The size of each sensor element 36 and the intensity of the autofocus light on the sensor elements preferably is selected such that each sensor element 36 is able to register more than $10^9$ photons per ms.

Data from the relative position sensor 20 are combined with data from the absolute position detector 7 of the focus-drive 9 and are interpreted by the real-time microscope-controller 10, thus enabling the latter to always recalibrate the absolute position of the focus drive 9 in terms of its distance relative to the sample-substrate 2 and to issue commands to the focus-drive 9, thus allowing it to assume and—in case of deviations—maintain a user-wanted focus position.

In the following example the reflected beam is assumed to have a width corresponding to 2 to 2.5 times the width of a sensor element 36, thus never occupying more than 3 sensor elements 36. Each of these sensor elements 36 delivers an intensity signal which is recorded by the real-time detector electronics 18 with a time-resolution of better than 1 kHz and is then evaluated by an intelligent real-time processor of the controller 19. The overall width of the sensor-array 17 is adjusted to the usable field of view of the objective 1, and the number of sensor elements 36 is chosen such that each element can distinguish intensity changes well below a $\partial I/I = 5*10^{-5}$.

In the example illustrated in FIG. 1A, a first reflected beam 34 (hereinafter also "first reflex"), stemming from the first optical interface 4 (which is closer to the objective 1 than the second optical interface 5), is recorded by the first group of three sensor elements (denoted by 37 in FIG. 1A) of the sensor-array 17, located at the upper edge of the sensor-array 17 in FIG. 1A and labeled #1 to #3 in FIG. 3) as soon as the focal plane of the objective 1 reaches the first interface 4. The corresponding z-position of the objective 1 is denoted $Z_{-1}$ in FIG. 3, which shows an example of the output signals of the channels of the sensor-array 17 for reflected autofocus light as a function of the z-position of the actuator 6 as sensed by the absolute position detector 8.

Figure 1B:
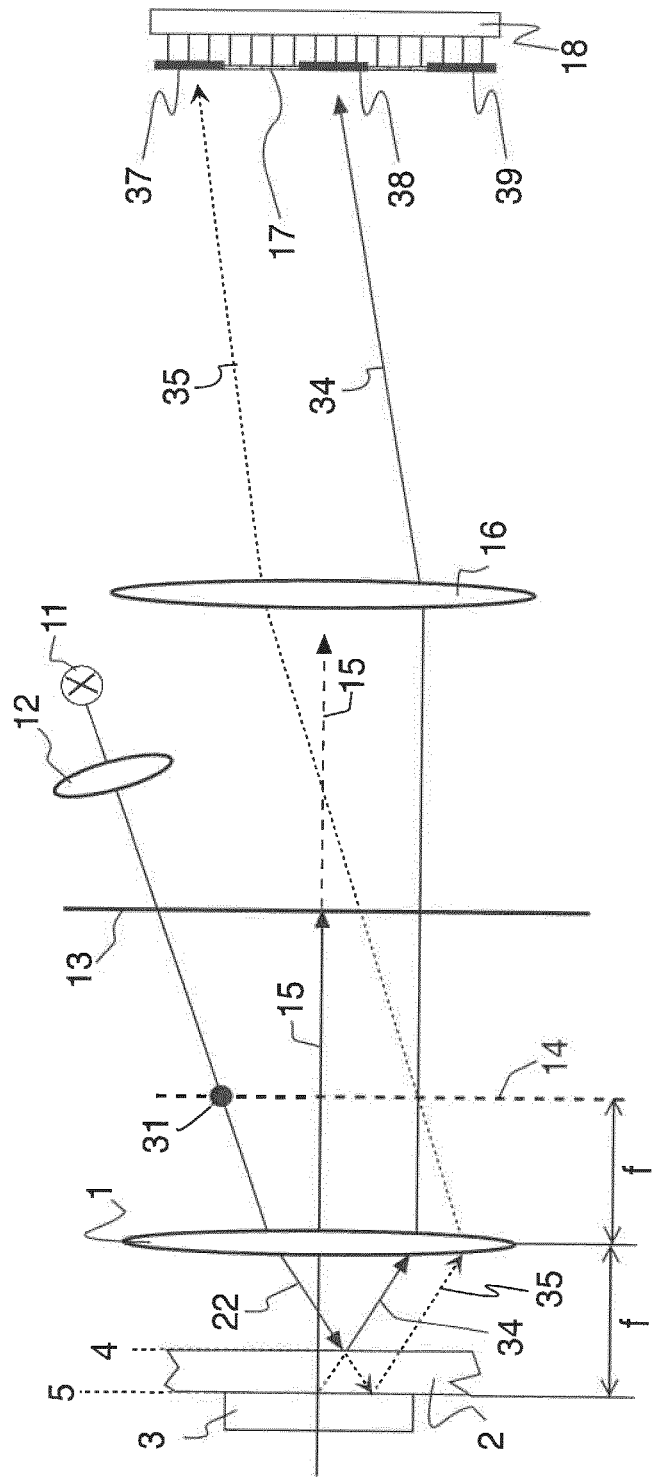
FIG. 1B is a view like FIG. 1A, wherein, however, the focal plane of the objective coincides with a substrate surface facing away from the objective.
Figure 2:
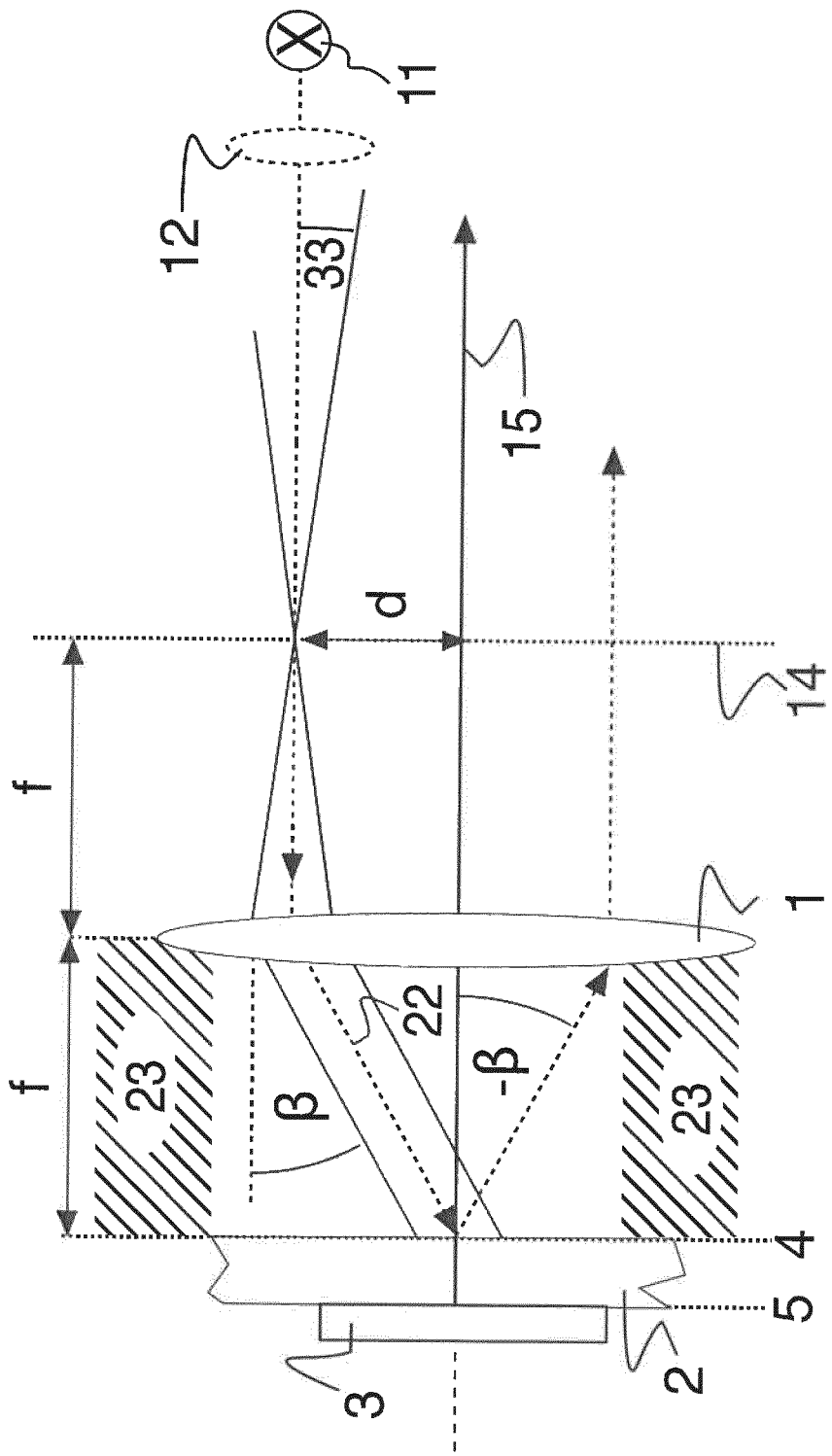
FIG. 2 is an enlarged illustration of part of the microscope device of FIG. 1.

When, as shown in FIG. 1B, the focal plane of the objective 1 has proceeded to the second optical interface 5 in the course of focusing process, it is the reflex 35 from this interface 5, which passes the first three sensor elements (denoted by 37 in FIG. 1B), whereas the reflex 34 from the first surface 4 is now seen somewhere in the middle of the sensor-array at a position 38.

Figure 3:
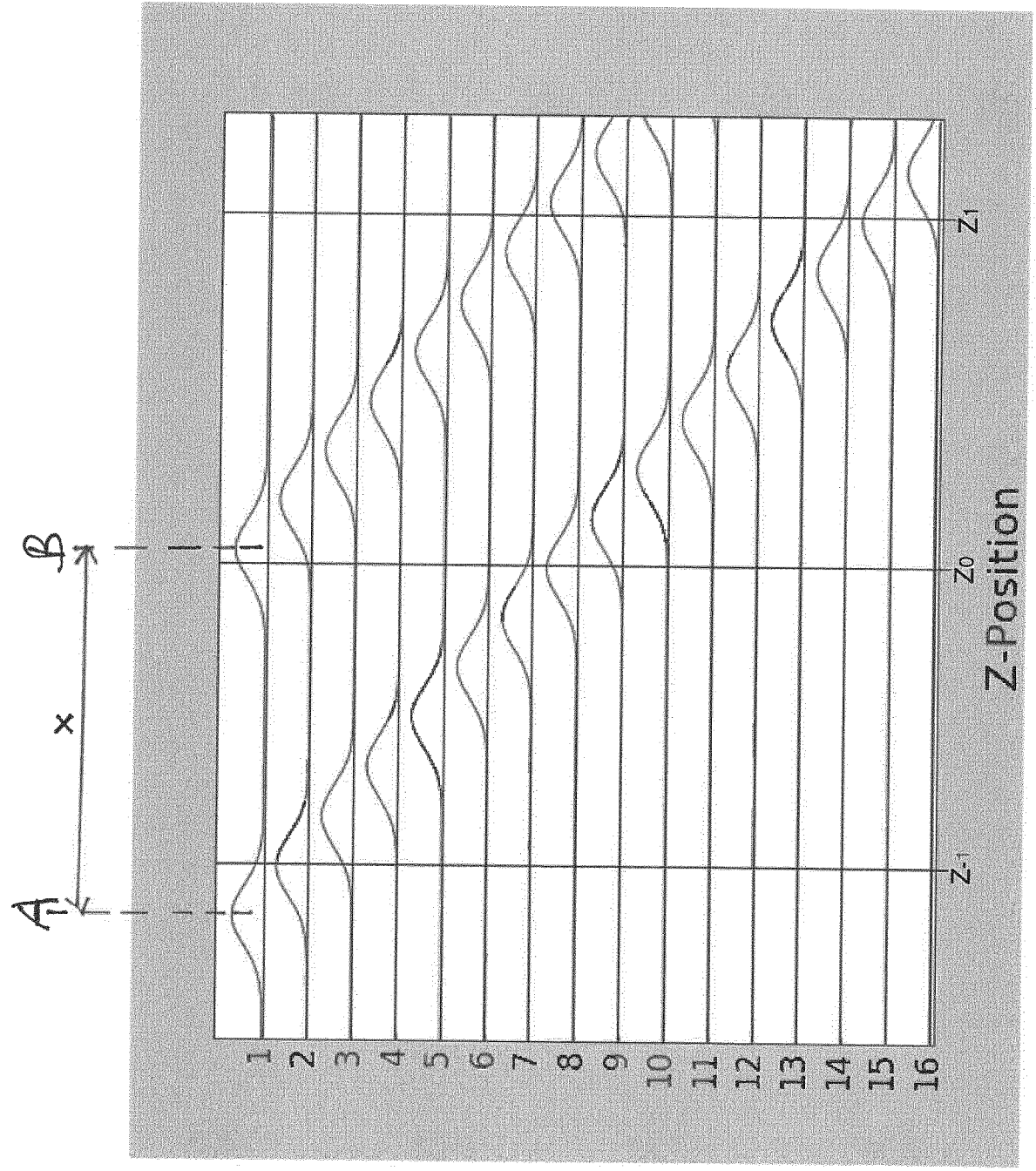
FIG. 3 is an example of the output signal of the 16 channels of an optical detector for reflected autofocus light as a function of the z-position of the actuator of the microscope objective.

On the other end of the working range of the objective 1, that is when the focal plane of the objective 1 reaches the position denoted Z 1 in FIG. 3, the reflected beam 34 from the first interface 4 is detected by the last three sensor elements 39, located at the lower edge of the sensor 17 in FIG. 1B and labeled #14 to #16 in FIG. 3, whereas reflex 35 from the second surface 5 is registered by sensor elements somewhere in the middle (position 38) of the sensor-array.

Typically, 16 sensor elements may be sufficient to cover the z-position range from $Z_{-1}$ to $Z_1$. As mentioned above, FIG. 3 schematically displays an example of the expected signals of all individual sensor elements 36 (denoted as #1 to #16) while the focal-plane of the objective 1 moves with constant velocity, first passing z-position $Z_{-1}$, i.e., the coverslip boundary 4 facing the objective 1, then z-position $Z_0$, i.e., the second interface 5 of the sample 3 facing the sample 2, to finally reach z-position $Z_1$, corresponding to the end of the working range of the objective 1.

The distance "x", travelled by the actuator 6 between the appearances of the first reflected beam 34 and the second reflected beam 35, (hereinafter also "second reflex") at a given sensor element 36—as registered by the relative position detector 20 as individual signal peaks in each channel (in the example of FIG. 3 the signal peaks corresponding to the first and second reflex are denoted "A" and "B", respectively)—is measured in absolute terms by the absolute position detector 7 of the focus drive 9; the measured value corresponds to the actual thickness of the sample substrate (coverslip) 3 and can be used for automatically adjusting the correction collar of the objective 1.

The autofocus mechanism described herein may use the appearance of the first reflex A from the first interface 4 as a "light-barrier" that marks a new starting point on its path to the user-defined target focus position. This light-barrier is hit when a pre-calibrated set of intensity-values from at least three sensor elements 36 is registered by the relative position detector 20. It is relayed, in real-time and with deterministically reproducible delay, to the central system controller 10, which combines this information from the relative position sensor 20 with information from the absolute position detector 7 so as to know exactly at which absolute z-position of the focus drive 9 the first interface 4 had been passed.

This z-position comparison by the two z-position detectors 7 and 20 enables the central system controller 10 to determine the user-requested final destination in absolute terms and to relay it to the focus drive 9 in time for the latter to settle for the desired target value. For this to work with the necessary precision, detectors and control-electronics should exhibit not only a bandwidth within 10 kHz to 100 kHz, but also reproducibly deterministic response-times and delays.

In case the desired final z-destination is the second interface 5, the central system controller 10 reads out the absolute position of the focus drive 9 at the moment when it passes $Z_{-1}$, adds the substrate thickness value x and aims at the newly defined absolute position $Z_{-1}+x$. If a target z-position beyond the second interface 5 is requested, the focus-drive 9 is programmed in real time accordingly, i.e. it obtains the information to go to $Z_{-1}+x+y$, whereby y is the requested distance into the sample substrate 2.

If the thickness x of the substrate 2 is not known yet, the autofocus system may make a qualified guess on the basis of its known substrate type (e.g., coverslips usually have a thickness of 170 μm), aims at $X_{-1}+170$ μm, whereby the position $X_{-1}$, again is determined when the light barrier is passed, and corrects its putative position then in a second step on the basis of the measured second reflex B. If such second reflex B is not available, the user has to perform the fine-adjustment manually on his own, and the autofocus system will remember it for future tasks using the same sample and sample substrate. Given that the standard coverslip-thickness usually varies only a few micrometers, this fine-adjustment is usually a minor one, only.

Preferably, the focus drive should allow for velocities of more than 2 mm/s in approaching the sample 3, with a response time of the relative position detector 20 of no more than 100 μs and a dead-time of the central system controller 10 between obtaining data from the relative position detector 20 and issuing a reprogramming command to the focus drive 9 of 5 ms or less.

Figure 4:
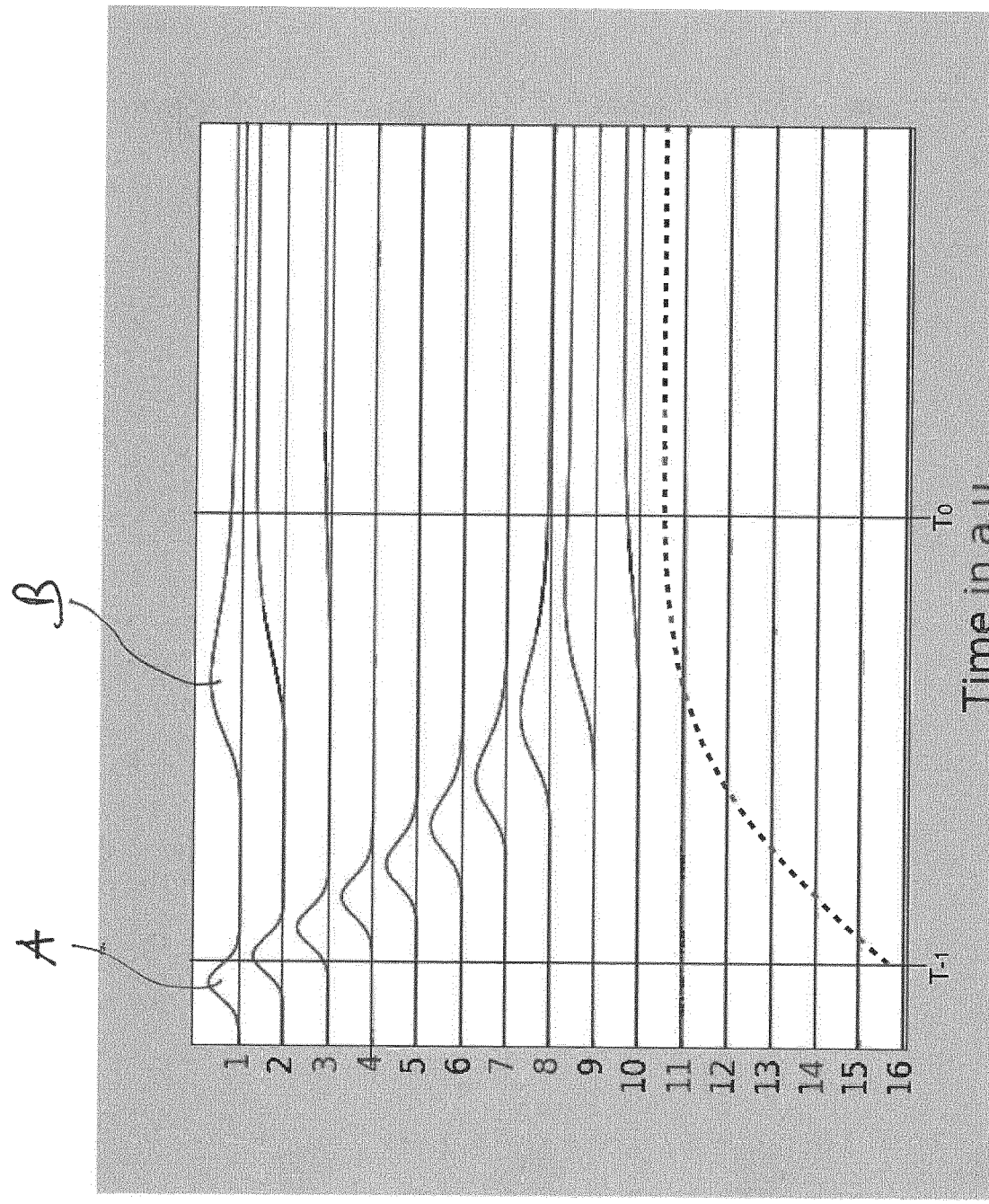
FIG. 4 is example of the output signal of the 16 channels of the optical detector of FIG. 3 as a function of time during movement of the microscope objective towards a target z-position.

FIG. 4 displays an example of intensity traces of the individual sensor elements 36 as a function of time for a focusing process, whereby reaching the position $Z_{-1}$ at $T_{-1}$ sets off a new position command which directs the focus drive 9 to $Z_0=Z_{-1}+z$. At time $T_0$ the target-position $Z_0$ is reached. Provided there is a reflex B from the second interface 5, the corresponding three sensor channels will show the anticipated triple-set of intensity values. In the example of FIG. 4 at time $T_0$ (when the target-position $Z_0$ has been reached) detector elements #1 to #3 of the sensor-array 17 measure the position of the second reflex B (originating from the second interface 5), whereas the triple-set of intensity values recorded by sensor elements #8 to #10 stem from the first reflex A, i.e., light reflected by the first interface 4. The dashed line in FIG. 4 indicates the z-position of the objective/focus drive as a function of time, while moving from position $Z_{-1}$ to position $Z_0$.

A z-position correction in the course of a "focus hold" operation employs the same procedure. A well detectable reflex measured by any three sensor-elements of the sensor 17 (preferably a reflex A from the first interface 4) is used as reference for the "to hold position"; deviations from this position are registered with a bandwidth of preferably at least 1 kHz, evaluated and lead, preferably within 5 ms, to a recalibration of the absolute detector 7 with respect to the relative position as measured by the relative detector 20, thus enabling a corresponding z-position correction of the focus drive 9.

As already mentioned above, the light from the IR-laser 11 is focused into the backfocal-plane 14 of the objective 1, and this focus is offset from the center, i.e., from the optical axis of the objective, by a value d such that collimation by objective 1 produces a beam 22 which is inclined by an angle β with respect to the central axis of the objective 1. As long as the refractive index of the medium 23 between objective and interface 4 corresponds to that of air, the condition sin β=d/f applies. If an immersion fluid is being used, appropriate corrections must be made. The reverse reflex from a sample related interface is collected by the objective 1 at an angle of "−β" and is imaged onto the sensor 17 with the help of a suitable tube lens 16. For maximum sensitivity, the sensor 17 should span the usable field of view of the objective 1, and the $1/e^2$ diameter of the reflex should make up roughly 12-15% of that range. Usually a sensor-array 17 with consisting of 16 sensor elements will suffice.

A finer spacing would reduce the signal detected by each sensor element and thus diminish the signal-to-noise ratio. To be able to distinguish changes in $\Delta I/I$ as small as $5*10^{-5}$ with 10 kHz bandwidth requires photocurrents as high as $4*10^{12}$ detected photons per second; this condition requires that the signal is not spread over too many sensor elements.

If the incoming laser beam 22 were entering the optical system parallel to the optical axis 15 of the objective 1, the reflected beam 34 from the first reflecting interface 4 would meet the middle of a centro-symmetrical detector 17, and it would shift to one side when focusing deeper into the substrate 3 and the into the sample substrate 2. In order to utilize the full field of view available for measuring the relative z-position, one has to tilt the incoming beam 22 to such a degree that the reflected beam 34 from the first interface 4 meets the sensor-array 17 near the middle, whereas the second reflected beam 35 from the second interface 5 is registered by the first few elements of the sensor 17 when the focal plane of objective 1 approaches the sample-interface 5. The former (34) meets the other end of the array of the sensor 17 when the objective leaves the working-space of the objective 1 in the sample 3.

There is a static and a dynamic calibration of the autofocus system. The static calibration, which is system dependent and needs to be carried out once, is performed in two steps. First the focus drive 9 is moved from one end of its (absolute) working space without any sample-substrate 3 being present in the beam. The resulting zero-lines for each sensor element contain all reflexes from within the optical system, which are stored as system invariables and subtracted in real-time during every autofocus procedure.

Next the same procedure is carried out in the presence of a typical glass substrate 3 (coverslip), which carries marks on each side. When the focal-plane of the objective 1 coincides with the plane of the first interface 4, that is when the microscope shows a sharp image of the mark on the surface 4, the reflected beam is distributed over 3 sensor elements 38 near one end of the sensor-array 17, e.g. over the sensor elements #1 to #3. The center of gravity of these three intensity values is stored and taken as "light barrier" for every subsequent focusing procedure. Next, the focus-plane of the objective 1 is moved until the other surface 5 of the substrate 3 is sharp and in focus. The first reflex 34 now has moved toward three sensor-elements (38) near the middle of the sensor array 17, whereas the second reflex 35 appears in the first quarter of the elements (position 37). The actual "z-distance" between the two surfaces 4 and 5, that is the thickness x of the substrate 3, is derived from the distance measured by the absolute z-position sensor 7 between the appearance of the first reflex 34 and the second reflex 35 on the first sensor elements 37. The change of the shape of the reflex from surface 4 between the first and the second position can be extrapolated to focus positions in the sample 3 beyond the second interface 5. The distance between the peaks A and B corresponds, for example, to the distance between the center of gravity of the peak A and the center of gravity of the peak B.

The dynamic calibration takes place in the course of every experiment, that is when the autofocus-functionality is requested. When the goal is to compensate for thermal drifts in the course of long-time experiments, it may be sufficient to recalibrate the absolute sensor 7 with respect to the relative sensor 20 every few seconds only. However, when the goal is to keep a rapidly moving sample in focus at all times, it may be necessary to recalibrate every millisecond and issue new position commands to the focus drive 9 at a similar rate.

The above described procedures require that there are optically detectable interfaces 4 and 5, wherein at least one of the interfaces needs to separate the substrate 2 from a medium exhibiting a refractive index different from that of the substrate 2 itself. This is the case, for example, if the immersion medium is air (refractive index n=1) or water (n=1.33) and the support-medium is glass (n=1.51). With an oil-immersion objective, where the refractive index of the immersion-fluid (n=1.51) equals that of glass, one of the two interfaces 4 and 5 may be coated with a layer transmitting all light used for imaging, but reflecting the light 22 from the autofocus light source 11. In this case the selected interface preferably is the first interface 4, since the reflex 34 from the first interface 4 is highly reproducible in shape, whereas the reflex from the second interface 5 may be distorted by the sample 3 attached to it. In case that only one reflecting surface/interface is available, the thickness x of the substrate (i.e. the distance between the interfaces 4 and 5) cannot be determined experimentally, so that the user has to correct the putative position of the second interface 5 under visual control. This correction value can be taken from there on, together with the measured absolute z-position of the first interface 4, to determine how far the focus drive 9 has to move from there to reach a given focus position. It is advantageous to use the first interface 4, that is the one nearer to the objective, as a reference, even if a second reflecting interface 5 is available, since the first interface 4 produces a clean reflex 34, whereas the reflex 35 from the second interface 5 (the interface between sample substrate 2 and sample 3) may not always constitute a consistently homogeneous reflecting surface.

The invention claimed is:
1. A microscope device comprising:
an objective (1);
an actuator (6) for adjustment of a distance between the objective (1) and a sample-holding substrate (2, 3) in a z-focusing direction during a focusing action, wherein the actuator (6) reaches and holds a desired focus position for the objective;
an absolute z-position detector (7) for measuring a z-position of the objective (1) in the z-focusing direction;
an autofocus light source (11);
a focusing element (12) for generating a focused spot (31) of an autofocus light from the light source in a backfocal plane (14) of the objective (1) at a position offset from an optical axis (15) of the objective by a lateral offset distance (d), such that the objective generates a collimated incoming beam (22) of the autofocus light, which is directed at an oblique angle relative to the optical axis (15) of the objective onto the substrate;
a dichroic beamsplitter (13) for separating the autofocus light (34, 35) reflected by substrate surfaces (4, 5)), from the optical axis (15), and a tube lens (16) for collimating the autofocus light (34, 35) and directing a collimated outgoing beam onto a sensor array (17) comprising a plurality of sensor elements (36);
a relative z-position detector (20) comprising the sensor-array (17) configured to detect a moving position of the collimated outgoing focusing light beam (34, 35) onto the sensor array during the focusing action, the moving position reflecting a change in the distance between the objective and the reflecting substrate surface (4,5) in the z-direction; and
a central control unit (8, 10) configured to control the actuator based on signals from the absolute z-position detector and the relative z-position detector, wherein the signals of the relative z-position detector are used to update the absolute z-position detector during focusing of the objective (1).

2. The microscope device of claim 1, wherein the absolute z-position detector (7) and the actuator (6) form part of a drive feedback control loop including a drive controller (8) for controlling the actuator to reach a z-position setpoint, and wherein the central control unit (10) is configured to determine the setpoint as a target z-position according to the signal from the relative z-position detector and to input that setpoint into the drive controller.

3. The microscope device of claim 2, wherein the central control unit (10) is configured to detect a point that the collimated outgoing autofocus light beam (34) has reached a predetermined threshold position (37) on the sensor array (17), to determine an absolute z-position provided by the absolute z-position detector (7) at that point as a threshold position of the actuator (6) and to determine the target z-position as the threshold z-position plus a target distance.

4. The microscope device of claim 3, wherein the substrate (2) is transparent and comprises a front surface (4) facing the objective (1) and a back surface (5) adjacent to a sample (3) and parallel to the front surface spaced apart by a thickness (x) of the substrate, wherein the threshold z-position corresponds to a z-position of the actuator (8) in which the backfocal plane (14) images the front surface (4) of the substrate (2) and wherein the target distance corresponds to a targeted depth within the sample (3) plus the thickness (x) of the substrate.

5. The microscope device of claim 4, wherein the thickness (x) of the substrate (2) is a preset value.

6. The microscope device of claim 4, wherein the central control unit (10) is configured to determine the thickness (x) of the substrate (2) as a difference between the threshold z-position and a second z-position provided by the absolute z-position detector (7) at the point that a position of the outgoing collimated light beam reaches a predetermined second position on the sensor-array (17) and wherein the second z-position corresponds to the z-position of the actuator (6) in which the objective focal plane images the back surface (5) of the substrate.

7. The microscope device of claim 3, wherein the central control unit (10) is configured to determine the threshold z-position from a position reported by the absolute z-position detector (7) at a time a pre-calibrated centroid of intensity values from at least three sensor elements (36) is registered by the detector (20).

8. The microscope device of claim 1, wherein the central control unit (10) is configured to calibrate the relative z-position detector (20) by recording, without a substrate (2) being used, for each sensor element (36), a signal as a function of the z-position of the actuator (6) so as to obtain baseline signals for each sensor element (36), which are then is subtracted from signals obtained with the substrate in place.

9. The microscope device of claim 1, wherein the lateral offset distance (d) is selected based on a working range of the objective (1) and on a width of the sensor-array (17) in such a manner that a reflected outgoing autofocus light beam (34, 35) moves across an entire width of the sensor-array such that a distance that the backfocal plane of the objective travels corresponds to a thickness of the sample-holding substrate (2, 3).

10. The microscope device of claim 1, wherein the collimated outgoing autofocus light beam (34, 35) extends over at least 2, and not more than 3, wherein the sensor-array (17) is a photodiode array configured to resolve a relative intensity variation of less the $1/10000$ and to achieve a time resolution of better than 1 ms, wherein an extension of the collimated outgoing autofocus light beam (34, 35) on the sensor array (17) is from 12 to 15% of a respective dimension of a usable field of view of the microscope objective (1), and wherein a size of the sensor-array (17) is selected to utilize the entire usable field of view of the objective (1).

11. The microscope device of claim 1, wherein the autofocus light source (11) is a diffraction limited infrared light source.

12. The microscope device of claim 1, wherein the actuator (6) is configured to change the distance between the objective (1) and the substrate (2) in the z-direction at a velocity of at least 2 mm/s, and wherein the actuator (6) is configured to move the objective relative to the substrate.

13. A method of operating a microscope device, comprising: using the microscope device of claim 1, to reach and keep a target z-position of the objective (1) and;
measuring the thickness x of the sample substrate (2), wherein the sample-holding substrate (2, 3) is transparent and made of glass and adjoins a sample (3) and the sample substrate comprises a front surface (4) and a back surface (5) parallel to the front surface spaced apart by the thickness (x) of the sample-holding substrate (2, 3).

14. The method of claim 13, wherein the objective (1) is an air objective used in air or an immersion objective used with an immersion liquid having a refractive index less than that of a material of the substrate (2), and wherein, the objective (1) is an oil immersion objective, and at least one of the surfaces (4, 5), of the substrate has a dichroic beamsplitter coating which reflects the autofocus light and is transparent for light used for sample illumination.

* * * * *